US006011839A

United States Patent [19]

Friedli et al.

[11] Patent Number: 6,011,839

[45] Date of Patent: Jan. 4, 2000

[54] CONTROL DEVICE FOR A LIFT

[75] Inventors: Paul Friedli, Remetschwil; Kilian Schuster, Ballwil, both of Switzerland

[73] Assignee: Inventio AG, Hergiswil, Switzerland

[21] Appl. No.: 08/932,695

[22] Filed: Sep. 18, 1997

[30] Foreign Application Priority Data

Sep. 26, 1996 [EP] European Pat. Off. ............. 96 810633

[51] Int. Cl.[7] ........................................................ H04M 9/00

[52] U.S. Cl. .................... 379/167; 379/102.06; 187/384; 187/388; 187/389

[58] Field of Search ..................................... 379/158, 159, 379/160, 161, 167, 168, 170, 102.06; 187/247, 305, 306, 380, 381, 384, 387, 388, 389, 395, 396, 397

[56] References Cited

U.S. PATENT DOCUMENTS

| | | | |
|---|---|---|---|
| 3,374,864 | 3/1968 | Port | 187/29 |
| 4,341,288 | 7/1982 | Bass | 187/384 |
| 4,431,086 | 2/1984 | Moser et al. | 187/384 |
| 4,558,298 | 12/1985 | Kawai et al. | 187/380 |
| 4,655,324 | 4/1987 | Meguerdichian et al. | 187/380 |
| 4,682,673 | 7/1987 | Umeda et al. | 187/126 |
| 4,836,336 | 6/1989 | Schroder . | |
| 4,915,197 | 4/1990 | Schroeder | 187/380 |
| 4,979,594 | 12/1990 | Begle et al. . | |
| 5,092,430 | 3/1992 | Goto et al. | 187/384 |

FOREIGN PATENT DOCUMENTS

| | | | |
|---|---|---|---|
| 0246395 | 2/1987 | European Pat. Off. . | |
| 0301178 | 4/1988 | European Pat. Off. | B66B 1/14 |
| 0341381 | 2/1989 | European Pat. Off. | B66B 1/46 |
| 0699617 | 8/1995 | European Pat. Off. | B66B 1/46 |
| 2602221 | 2/1988 | France | B66B 5/00 |

OTHER PUBLICATIONS

Patent Abstracts of Japan, No. 07157224 Jun. 20, 1995 re appln. 05304983.

Patent Abstracts of Japan, No. JP 215 2880 Jun. 12, 1990 re appln. JP 880 306060 Dec. 5, 1988.

*Primary Examiner*—Curtis A. Kuntz
*Assistant Examiner*—Rexford N. Barnie
*Attorney, Agent, or Firm*—Schweitzer Cornman Gross & Bondell LLP

[57] ABSTRACT

A control device for access and lift operation to a predetermined story in multi-family dwellings or other buildings is provided. Call input devices which may comprise a first input button and a second input button are provided in the upper stories of the building, such as in individual apartments or offices. Upon the processing of a call which has been input by the first input button located at an identified story initially a predetermined destination story and thereafter the identified story are served by the lift. On processing of a call which has been input by the second input button initially the identified story and thereafter the predetermined destination story are served. The call input device may further comprise an identification device to allow automatic lift from an entry story to the story associated with the identified user.

9 Claims, 2 Drawing Sheets

CONTROL DEVICE FOR A LIFT

The present invention relates to a control device for a lift, with call input devices which are provided at the stories and by means of which calls for destination stories can be input, wherein when the input is made a call characterizing the input story and a call characterizing the destination story are stored.

BACKGROUND OF THE INVENTION

A control device for lifts has become known by EP-A-0246 395, which device comprises call registering devices with the features of the foregoing category. The call registering devices arranged at the stories are equipped with numeric keypads for the input of calls for desired destination stories. As the destination calls correspond to the cage calls entered through conventional controls, no cage call buttons are provided in the lift cages themselves.

Such control devices, also called destination controls, are used in particular for the control of groups of lifts, wherein considerable advantages such as, for example, optimization of the assignment of cages to calls, shorter waiting and travel times for passengers, and an increase in the elevating capacity, are achieved.

It is further known from EP-A-0 699 617 to provide call registering devices of the above-described control devices with so-called recognition devices. The recognition devices respond to a data transmitter, for example in the form of a credit card, wherein the data exchange takes place by way of electromagnetic fields according to the transmitter/receiver principle. The data transmitter can contain, for example, an identification code of a person authorized to use a lift or the number of a desired destination story. The call registering device is activated and the identified destination call automatically triggered by the identification. In such a lift installation, persons who do not have a data transmitter must initially determine their destination story and then input manually. Moreover, the access of these persons cannot be monitored without further measures.

BRIEF DESCRIPTION OF THE INVENTION

The present invention has as its object the proposing of a control device for a lift, which does not exhibit the above-mentioned deficiencies and facilitates locating and tracing of a desired occupant by persons unfamiliar with the building.

This object is met by the present invention indicated in patent claim 1. In that case the call input devices provided on the stories have a first and a second input button means. The processing of a call which has been input through the first input button proceeds by initially serving a determined destination story and thereafter the input story. The processing of a call which has been input through the second input button proceeds by initially serving the input story and thereafter the determined destination story. The invention has the advantage that a building occupant can, on opening of the building door from his premises or apartment, at the same time make available to a visitor a lift which brings the visitor directly to the right story without additional buttons for the lift use having to be pressed. Moreover, an occupant can order a lift from his apartment.

A resident or a visitor can be identified by an identification device such as an answer-phone installation, a telephone or a speech or fingerprint recognition device. In a preferred embodiment for dwellings, the identification device is an answer-phone and the predetermined destination story is the main lift stop on the entrance story. The call input device may be operatively connected with the entrance door and an entrance board of the building, so that additional input boards in front of the lifts or in the lift cages can be dispensed with. Persons such as, for example, tenants or owner-occupiers, who prove their identity at an entrance board by means of a corresponding data transmitter, obtain building admission and the reservation of a lift to their dwellings without call input buttons having to be actuated. Security of privacy, for example in a multi-family apartment block, is optimally guaranteed. Visitors are conducted exactly to the right story; a visitor going astray into a wrong story is prevented.

BRIEF DESCRIPTION OF THE DRAWINGS

The invention is more fully explained in the following description of an illustrative embodiment, in conjunction with the annexed drawings, in which.

DETAILED DESCRIPTION OF THE INVENTION

Figure 1:
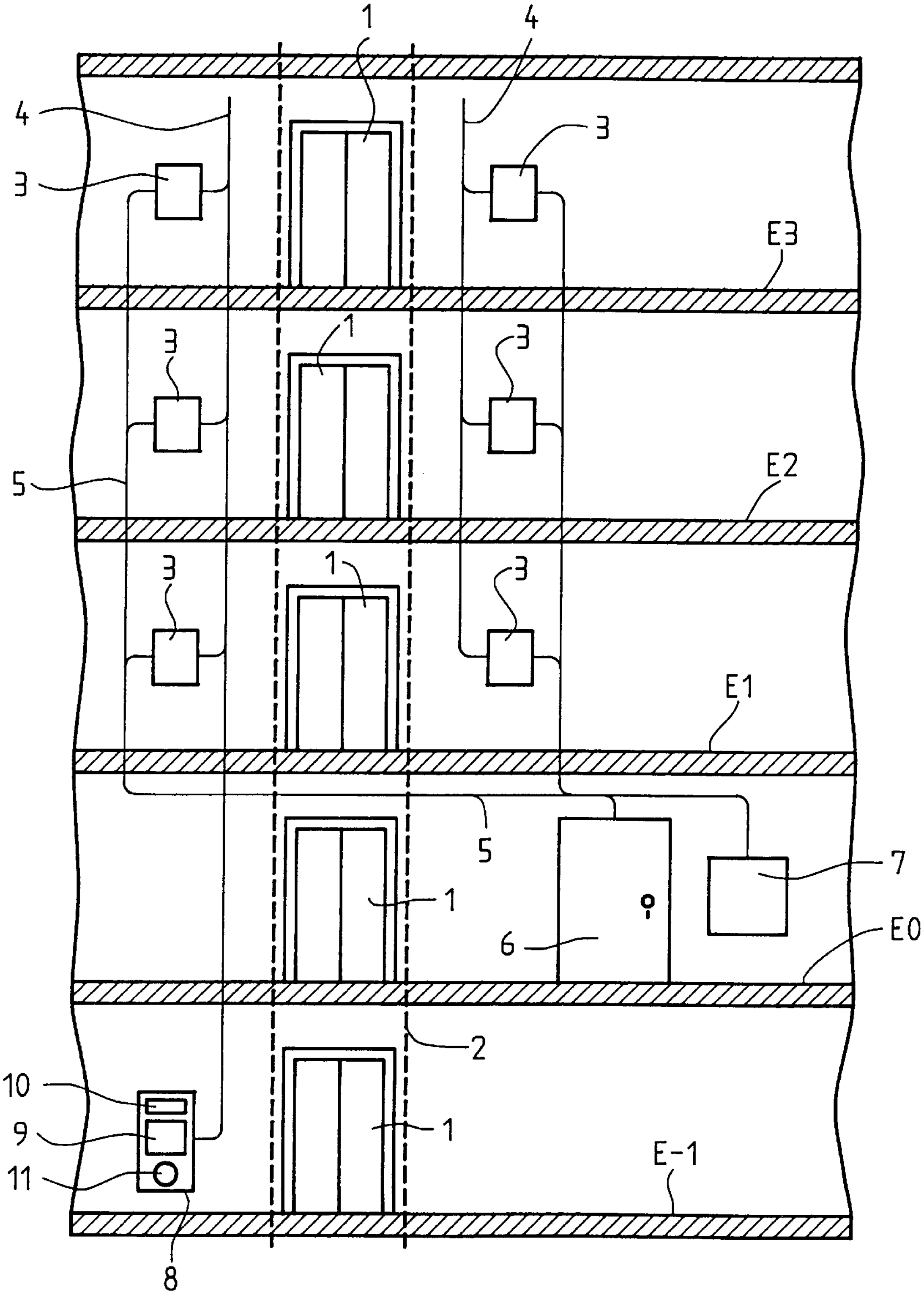
FIG. 1 is a schematic illustration of the control device according to the invention.

Shaft doors of a lift are designated by 1 in FIG. 1, which doors are arranged on stories E-1, E0, E1, E2 and E3 of, for example, a multi-family apartment block, and by way of which a lift cage guided in a lift shaft 2 is accessible. The main stopping place for the lift is disposed on the entrance story, usually on the ground floor E0. Call input devices 3 are arranged in the individual dwellings, offices, practices, etc. of the building, accommodated on the stories, typically near a shaft door 1, which forms an apartment door. The call input devices 3 are connected by way of lines 4 with a lift control, which is not further described or illustrated and which preferably works according to the destination control principle which has become known from, for example, EP-A-0 246 395. The call input devices 3 are also connected by way of lines 5 with an entrance door 6, which forms the access portal to the main stopping place E0, and to an entrance board 7 mounted in the region of the entrance door 6.

A further call input device 8 is arranged on story E-1 which may be, for example, an underground garage. This further call input device 8 has, like as known from EP-A-0 699 617, a numeric keypad 9, an indicating device 10 and a recognition device 11. The recognition device 11 responds to a data transmitter, for example, in the form of a credit card, which contains, for example, the number of the desired destination story of the user or an identification code of an authorized lift user to which a destination story filed in a store is assigned, whereby a call for the destination story can be triggered automatically by a data transmission. Calls for other destination stories can also be input by way of the numeric keypad 9. The recognition device 11 can also be constructed as a speech recognition module or as a pattern recognition module for fingerprints. Thus, registered occupants of a building can be recognized even without a data transmitter in credit card form.

Figure 2:
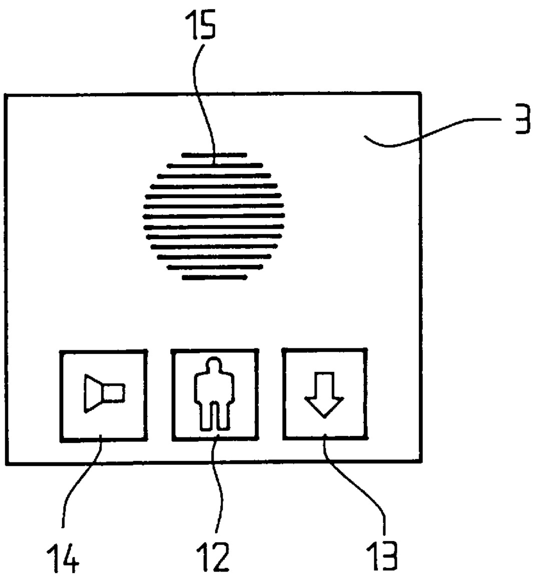
FIG. 2 is an elevation view of a call input device of the invention in a scale enlarged relative to FIG. 1.

FIG. 2 shows a call input device 3, which comprises a first input button 12—also called a “visitor button”—characterized in the figure by a symbol of a person, and a second input button 13 characterized here by, for example, a downward-pointing arrow. In the case of processing by the lift control of a call which is input by the first input button 12, a predetermined destination story—for example, the main stopping place E0—is initially served, and thereafter the input story. In the case of processing of a call which is input by the second input button 13, however, initially the input story and thereafter the predetermined destination story are served.

The lift control can also be designed in such a manner that a further predetermined destination story—for example the basement floor or the underground garage E-1—is alternatively served. For that purpose the second input button 13 may be pressed twice, several times in short succession, or constantly for an extended period, as programmed into the system.

The call input device 3 further comprises an identification device which, for example, may comprise a conventional answer-phone installation, wherein a changeover button for speaking and listening, which is characterized as known by a loudspeaker symbol, is designated by 14 and sound slots are designated by 15. Instead of a dedicated call input device for the lift, a telephone set of an internal communications installation can also be used, which is particularly of advantage in office buildings. The lift call is then effected by input of a preset code, which passes on the signal to the lift control.

Figure 3:
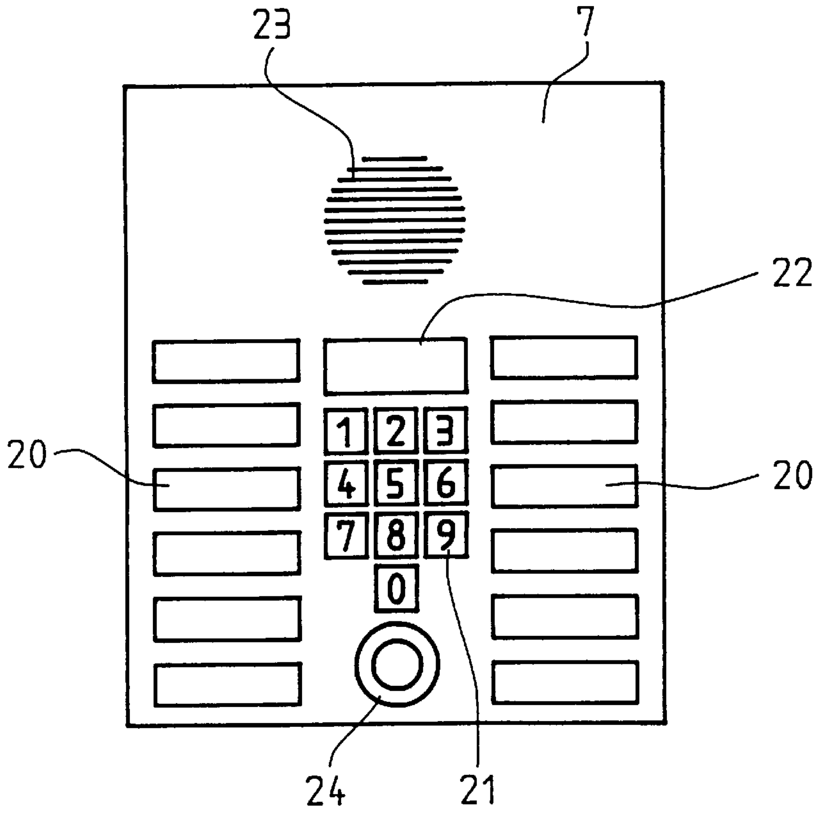
FIG. 3 is an elevation view of an entrance board of the invention in a scale enlarged relative to FIG. 3.

Numbered name plates, with which are associated signal transmitters 21 in the form of a numeric keypad, are designated by 20 in FIG. 3. Bells or buzzers as usually mounted in dwellings can be activated by means of the signal transmitters 21. Arranged above the signal transmitters 21 are an indicator device 22 and sound slots 23 of the answer-phone installation. Provided below the signal transmitters 21 is a recognition device 24, which works in the same manner as the recognition device described with reference to FIG. 1. The numeric keypad can be alternatively omitted. The bell buttons at the name plates, which are connected with the control device for the lift, then can simply serve as signal transmitters.

The above-described control device operates as follows: On reception of a visitor, he or she reports to the intended occupant by means of the signal transmitters 21 and after positive identification has taken place is let in by way of the answer-phone installation. For that purpose, the occupant doing the letting-in actuates the visitor button 12 of the call input device 3 located in his apartment, whereby the entrance door 6 is opened and a pair of lift calls identifying the predetermined destination story and the input story are triggered. In the ensuing processing of the calls by the lift control the lift cage initially travels to the destination story (the main stopping place—ground floor E0) and stands ready for the visitor. After he or she has boarded, which can be automatically recognized by, for example, load measuring in the cage, the lift cage travels to the input story which apartment of the occupant being visited is located. During use of the lift the visitor is not faced with the dilemma of having to press any buttons, as buttons are provided neither at the main stopping place E0 nor in the lift cage. If the destination story and input story are the same, the lift call is obviously redundant.

If an occupant wants to leave the apartment and the building, he presses the second input button 13, whereupon a call characterizing the predetermined destination story and a call characterizing the input story are triggered. The lift cage in that case, however, travels initially to the input story and, after the boarding by the occupant, to the destination story (main stopping place E0). The occupant can now leave the building by the entrance door 6 which can normally be opened from the inside without problems. On entrance into the building the occupant is identified through his data transmitter by the recognition device 24 at the entrance board 7 as a person authorized for access. The entrance door 6 is thereby opened and, as the residential (input) story of the person identified is also known by the identification, the corresponding data is passed on to the lift control. The lift cage thereupon travels to the main stopping place E0 and, after the resident has boarded, to his residential story.

In accordance with the respective character of a building, usage customs of the users or occupants, desired service convenience and required access checking, only individual ones of the above-described call input devices buttons or a combination thereof can be employed. Also, the access to the underground garage (story E-1) can be integrated whereby on driving or stepping into the story, the prospective lift user can be identified and a call for the lift subsequently triggered, for example, when making use of a door between the underground garage and the lift. In a similar manner, call triggering can be stopped for persons who like to use the stairs in lieu of the lift.

We claim:

1. A remote control device for a lift for a multistory structure, comprising at least one call input device located at a story for the entry of lift call data, said data comprising the identity of the story of the input device initiating the entry and an intended destination story characterized in that the call input devices have a first and a second input means, said first means providing for the travel of a lift cage first to the destination story and subsequently to the input story, said second input means providing for the travel of a lift cage first to the input story and subsequently to the destination story.

2. A control device according to claim 1, characterized in that the call input device comprises an identification device.

3. A control device according to claim 1, characterized in that the call input device stands in operative connection with an entrance door and an entrance board of the structure.

4. A control device according to claim 1, characterized in that the call input device is located in a dwelling or room of the respective story.

5. A control device according to claim 1, characterized in that the predetermined destination story is a main stopping place.

6. A control device according to claim 2, characterized in that the identification device is an answer-phone or a telephone.

7. A control device according to claim 1 wherein one of said input means further comprises means to providing for the travel of a lift cage to the input story and subsequently to a further predetermined destination story upon the input of a unique operating sequence for the input means.

8. A control device according to claim 7, characterized in that the further predetermined destination story is an underground garage.

9. A control device according to claim 3, wherein the entrance board has name plates and signal transmitters associated therewith and an answer-phone installation, characterized in that a recognition device is provided at the entrance board.

* * * * *